UNITED STATES PATENT OFFICE.

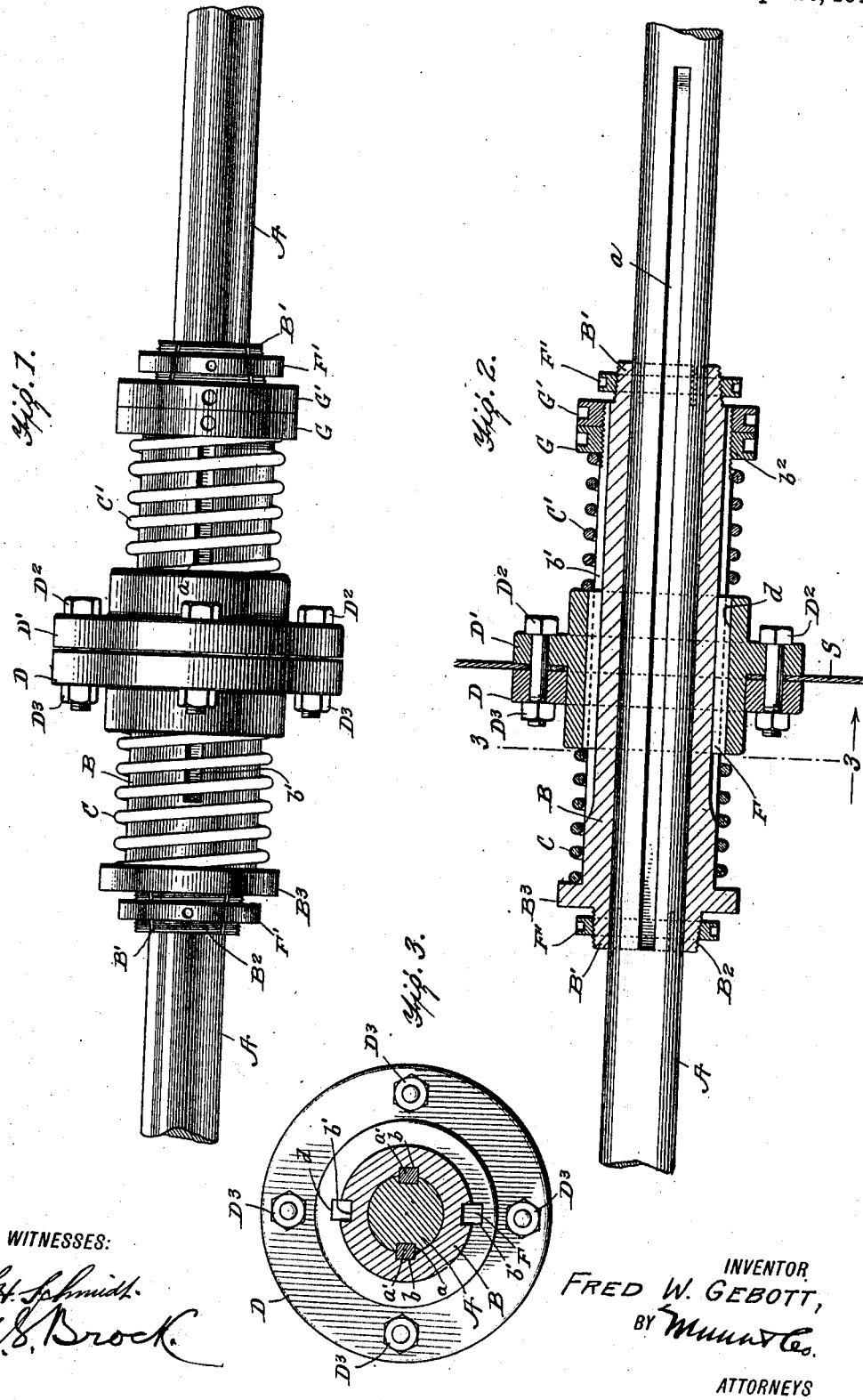

FREDERICK W. GEBOTT, OF EVERETT, WASHINGTON.

SLASHER-HEAD AND COUPLING.

970,915.  Specification of Letters Patent.  Patented Sept. 20, 1910.

Application filed January 19, 1910.  Serial No. 538,881.

*To all whom it may concern:*

Be it known that I, FREDERICK W. GEBOTT, a citizen of the United States, and resident of Everett, in the county of Snohomish and State of Washington, have invented certain new and useful Improvements in Slasher-Heads and Couplings, of which the following is a specification.

My invention relates to improvements in slasher heads and couplings used in saw mills for cutting slabs and edgings, in lengths, and has for its object to produce a device which shall allow the saw to recede and release itself when under side strain.

My invention consists in certain novel features of construction, arrangement and combination of parts as will be hereinafter fully described and pointed out in the claims, reference being had to the accompanying drawing in which, Figure 1 is a side elevation of my device, Fig. 2 is a longitudinal section of the same, Fig. 3 is a transverse section on line 3—3 of Fig. 2.

In the drawing, A represents the shaft which is provided with diametrically opposite key seats $a$ $a$ in which are placed the keys or splines $a'$, $a'$. Upon the shaft is slid the sleeve B having its ends B' tapered and slitted; these slitted ends have an external thread at $B^2$; the sleeve B is also provided within its bore with the grooves $b$, $b$ which fit over the keys $a'$, $a'$ and prevent the sleeve from revolving on the shaft A; near one end of the sleeve B is an annular flange $B^3$ between which and the collar, which carries the saw, is placed a coil spring C. The collar is made in two parts D and D', between which the saw S is clamped by bolts $D^2$ and nuts $D^3$; the collar has diametrically opposite internal longitudinal grooves $d$ $d$ which aline with longitudinal grooves $b'$, $b'$ in the outer face of the sleeve B, and in these alining grooves keys F are placed, coupling the saw collar and the sleeve together. Upon the slitted tapered ends of the sleeve B are threaded tapered clamp rings F' for tightly clamping the sleeve to the shaft A. The sleeve B at the end opposite the end which has the annular flange $B^3$ is also externally threaded (see $b^2$) just in the rear of its tapered end, and on this threaded portion are threaded the jam nuts G and G'; between the jam nut G and the saw collar is placed another coiled spring C' and by means of the jam nuts G and G', the tension of the springs may be regulated.

By the construction shown, it will thus be seen that the saws, of which there are a number on each machine, and in a direct line with each other, will release themselves when under side strain.

The tapered nuts F' and the jam nuts G and G' are provided with sockets into which the ends of a spanner wrench may be inserted to manipulate said nuts.

I claim:

1. A saw carrying shaft, a sleeve, rigidly mounted thereon, a saw coupling head slidably mounted on said sleeve, and resilient means on each side of said coupling head engaging said sleeve and coupling head.

2. A saw carrying shaft, a sleeve rigidly mounted thereon, collars adjacent the ends of said sleeve, a saw coupling head slidably mounted on said spring, and springs mounted on said sleeve on each side of the coupling head and engaging the aforesaid collars.

3. A saw carrying shaft, a sleeve, rigidly mounted on said shaft, a saw coupling head slidably mounted on said sleeve, coiled springs mounted on the sleeve on each side of the saw coupling head, and means, mounted on the sleeve for adjusting the tension of said springs.

4. A saw carrying shaft, a sleeve keyed to said shaft, said sleeve having slitted tapered ends, a saw coupling head slidably mounted on said sleeve, coiled springs mounted on said sleeve on each side of said coupling head, and tapered nuts or rings engaging the slitted tapered ends of the sleeve.

5. A saw carrying shaft, a sleeve keyed to said shaft, said sleeve having slitted tapered ends, and an annular collar adjacent to one of said ends, said sleeve having its opposite end externally threaded in the rear of the slitted end, jam nuts threaded on said threaded portion of the sleeve, tapered nuts fitted on the tapered ends of the sleeve, and coiled springs mounted on the sleeve on each side of the coupling head and abutting the annular collar and jam nut, respectively.

FRED. W. GEBOTT.

Witnesses:
G. C. ALSTON,
R. H. GEBOTT.